United States Patent [19]

Susuki et al.

[11] Patent Number: 4,734,545
[45] Date of Patent: Mar. 29, 1988

[54] INSULATED CONDUCTOR FOR A WIRE HARNESS

[75] Inventors: Isao Susuki, Chiba; Tomomi Hizikata, Ohmihachiman, both of Japan

[73] Assignee: The Furukawa Electric Co., Ltd., Tokyo, Japan

[21] Appl. No.: 935,400

[22] Filed: Nov. 26, 1986

[51] Int. Cl.⁴ ............................................. H01B 7/02
[52] U.S. Cl. ..................... 174/120 SR; 174/110 SR; 174/113 A; 174/130; 428/378; 428/383
[58] Field of Search ................... 174/120 SR, 110 SR, 174/72 A, 113 A, 121 A, 130; 428/378, 383

[56] References Cited

U.S. PATENT DOCUMENTS

| | | | |
|---|---|---|---|
| 2,930,838 | 3/1960 | Chizall et al. | 174/120 SR |
| 3,760,093 | 9/1973 | Pemberton | 174/130 X |
| 3,971,882 | 7/1976 | Alia | 174/120 SR X |
| 4,008,368 | 2/1977 | Leuchs | 174/120 SR X |
| 4,062,998 | 12/1977 | Hagiwara et al. | 174/120 SR X |
| 4,324,837 | 4/1982 | Miyake | 174/120 SR X |
| 4,379,807 | 4/1983 | Otis et al. | 428/383 |
| 4,511,624 | 4/1985 | Kawaguchi et al. | 174/110 SR X |

OTHER PUBLICATIONS

Machine Design; Materials Reference Issue; Apr. 18, 1985; pp. 149, 150 and 193-195.

Primary Examiner—Morris H. Nimmo
Attorney, Agent, or Firm—Pearne, Gordon, McCoy & Granger

[57] ABSTRACT

An insulated conductor for a wire harness comprising a conductor and an insulation with which the conductor is covered, the insulation being formed of thermoplastic polyurethane having shore D hardness of more than 50, thickness of less than 0.2 mm, and an adherence of the insulation to the conductor less than 2 Kg/10 mm, being measured as the required force to pull 10 mm of the insulation off the conductor.

7 Claims, 10 Drawing Figures

INSULATED CONDUCTOR FOR A WIRE HARNESS

BACKGROUND OF THE INVENTION

An insulated conductor for a wire harness for a car, as shown in FIG. 1, comprises a bundle 2 of a plurality of insulated conductors 1 having a predetermined length with a covering 3 of tape wound on the bundle holding it together. Each of the insulated conductors 1 has ends exposed and parts 7 such as connectors connected to the exposed ends.

Lately, there have been various specifications of a car, which increases the number of parts and the number of wiring circuits. Accordingly, a wire harness has the diameter enlarged and the weight increased. For example, the diameter of the wire harness for the car changes from 20 through 30 mm of the prior art harness to 50 through 60 mm. It will be noted that this is contrary to the requirement of enlargement of a space within the car and of lightness of the car. Also, this causes the weight of the wire harness to increase and the number of operators for assembling the wire harness to increase. Thus, it will be noted that the smaller diameter and lighter weight of the wire harness are required for meeting the requirement of car design and for assembling the wire harness without any decrease in effectiveness of operation.

As shown in FIG. 2, one of the prior art insulated conductors for wire harness comprises an insulation 5 of vinyl chloride provided on a conductor 4. The conductor 4 comprises a twisted conductor formed by twisting a plurality of copper wire elements 4a while the insulation 5 is formed by extruding vinyl chloride on the twisted conductor. The thickness of the insulation 5 normally ranges from 0.6 mm to 1.1 mm and is 0.4 mm in case of thinnest insulation.

In order to make the diameter of the wire harness smaller, it is effective to thin the insulation 5 of the insulated conductor. However, if the insulation 5 is thinned, the abrasion resistance of the insulated conductor is lowered, which disadvantageously causes the insulation of the insulated conductor to be damaged when the wire harness is assembled, installed and treated thereafter.

The conductor 4 of twisted wires provides flexibility and softness to the insulated conductor, which preferably aids the conductor to be compressively secured to terminals, but the twisted conductor tends to have wire elements untwisted and protruded, which causes the cross section of the insulation on the conductor to have an out-of-round excursion as indicated by dotted line of FIG. 2 with the result that the insulation 5 of vinyl chloride tends to have a thick portion as indicated by t (max) and a thin portion as indicated by t (min). In case that terminals are compressively secured to the ends of the insulated conductor, the insulation at the ends of the insulated conductor has to be removed. This is accomplished by stripping blades 6 into the insulation 5, as shown in FIG. 3, so that the blades 6 never contact the conductor 4 while they are moved as indicated by an arrow in FIG. 3. If the blades 6 contact the conductor by any chance, then the conductor 4 is damaged, which causes the insulated condcutor to be cut due to vibration applied thereto from the car. If the insulation 5 is thicker, the conductor 4 is never damaged even though the wire elements 4a are slightly untwisted or protruded, but if the insulation is thinner and the wire elements 4a are untwisted or protruded, this causes the conductor 4 to be possibly damaged when the insulation is removed.

SUMMARY OF THE INVENTION

Accordingly, it is a principal object of the invention to provide an insulated conductor for wire harness adapted to have a smaller diameter by thinning an insulation without any decrease in abrasion resistance of the insulation.

It is another object of the invention to provide an insulated conductor for wire harness wherein a conductor is not damaged when an insulation is removed.

In accordance with the present invention, there is provided an insulated conductor for a wire harness comprising a conductor and an insulation with which the conductor is covered, the insulation being formed of thermoplastic polyurethane having shore D hardness of more than 50 and thickness of less than 0.2 mm.

With the insulation formed of thermoplastic polyurethane having shore D hardness of more than 50, the abrasion resistance of the insulation is larger, which allows the insulation to be thinner and the diameter of the insulated conductor to be smaller.

The conductor may be either a single conductor or a twisted body of wire elements, and may be preferably a compressed conductor formed by compressing the twisted body into a body having a round cross section. With the conductor compressed, the wire elements are neither untwisted nor protruded, less insulation is embedded into the space between the wire elements of the twisted body, which eases the removal of the insulation. Thus, it will be noted that the diameter of the insulation becomes uniform, which causes the conductor to be never damaged.

It has been found by the inventors that a failure to remove all of the insulation depends on the thickness difference of the insulation, that is a difference between the maximum and minimum thicknesses, and on the adherence of the conductor to the insulation. According to the invention, with the thickness difference of less than 40 μm, no failure of removal is caused and also with the adherence of the conductor to the insulation of less than 2 kg/10 mm, no failure of removal is caused.

BRIEF DESCRIPTION OF THE DRAWINGS

The above and other objects and features of the invention will be apparent from the description of the embodiments taken along with reference to the accompanying drawings in which.

DETAILED DESCRIPTION OF THE EMBODIMENTS

Figure 1:
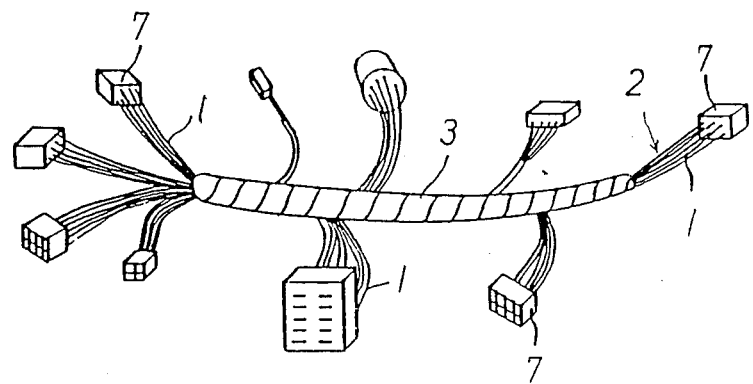
FIG. 1 is a perspective view of a conventional wire harness.
Figure 2:
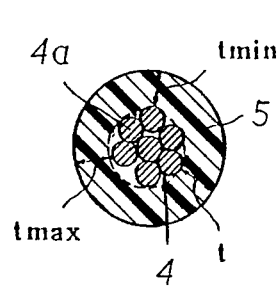
FIG. 2 is a cross sectional view of a prior art insulated conductor for wire harness.
Figure 3:
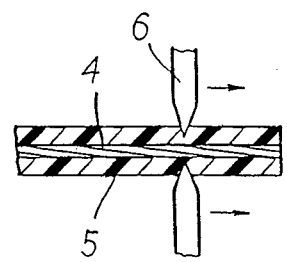
FIG. 3 illustrates an insulation of the insulated conductor for wire harness being removed.
Figure 4:
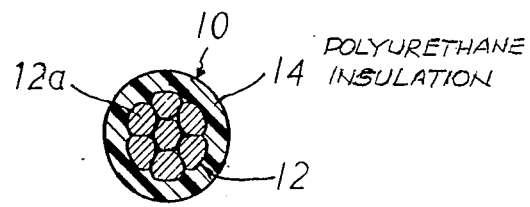
FIG. 4 is a cross sectional view of an insulated conductor for wire harness constructed in accordance with one embodiment of the invention.

Referring now to FIG. 4, there is shown an insulated conductor 10, which comprises a conductor 12 and an insulation 14 provided on the conductor 12.

The insulation 14 comprises thermoplastic polyurethane having shore D hardness of more than 50 and has the thickness of average less 0.2 mm. Thermoplastic polyurethane is formed by polycondensing long-chain polyol having polyester or polyether bond and short-chain polyol by aromatic or aliphatic diisocianate. Thermoplasticity is produced by arranging urethane-bond (—NHCOO—) substantially in series to each other and has a mouldable property by melting material at high temperature. Various hardnessses may be provided by selecting polyol and diisocianate. Thermoplastic polyurethane has a higher abrasion resistance than vinyl chloride has and the thermoplastic polyurethane has shore D hardness of greater than 50 with the result that thermoplastic polyurethane of thickness of less than 0.2 mm can have the abrasion resistance equal to that of vinyl chloride of thickness of 0.6 mm, which is generally used for a conventional insulated conductor.

The conductor 12 may comprise a twisted body formed by twisting a plurality of copper wire elements 12a or may comprise a compressed conductor formed by compressively deforming the twisted body into one having a substantially round cross section, as shown in FIG. 4. The compressed conductor 12 can be produced by passing the twisted body through a die or through a shaping roll to decrease the diameter thereof. In this manner, the wire elements 12a are deformed into non-round cross section so as to fill the space within the twisted body, which prevents the wire elements from being untwisted or protruded so that the twisted body is deformed into round cross section. Thus, it will be noted that the thickness of the insulation 14 never varied, although it is less than 0.2 mm.

For example, with the insulation of 0.15 mm thickness provided on the conductor of 0.5 mm diameter, the thickness difference H is determined by the following expression;

$$H = \{(t\ max - t\ min) \div (t\ max + t\ min)\} \times 100\%$$

In this expression, t max designates the maximum thickness while t min designates the minimum thickness. It was acknowledged that the thickness difference H was about 15% when the conductor 12 was not compressed, but decreased to about 5% when the conductor 12 was compressed.

With the insulation of thermoplastic polyurethane having shore D hardness of more than 50, the abrasion resistance of the insulation becomes larger, which allows the thickness of the insulation to be thinner and the diameter of the insulated conductor to be smaller.

The conductor 12 may be either a signal conductor or a twisted body of wire elements, and may be preferably a compressed conductor 12 formed by compressing the twisted body into one having a round cross section.

With the conductor 12 compressed, the wire elements 12 are neither untwisted nor protruded to make the surface of the conductor 12 smooth and less insulation is embedded into the space between the wire elements 12a of the twisted body. Thus, it will be noted that the diameter of the insulation becomes uniform and that the adherence of the conductor to the insulation decreases, which causes the conductor not to be damaged upon removal of the insulation even though the thickness of the insulation is smaller.

Figure 5:
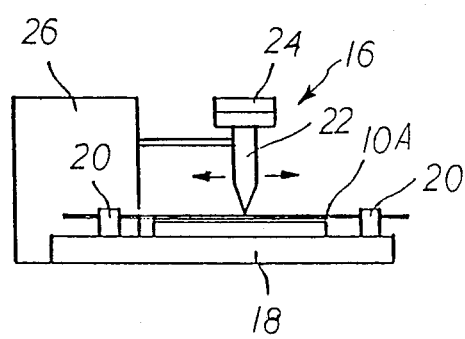
FIG. 5 is a front view of a scraping tester for determining an abrasion resistance of the insulated conductor for wire harness.

The abrasion resistance of the insulated conductor for a wire harness can be expressed by the number of scraping times of the scraping test. This test can be accomplished by a scraping tester as shown in FIG. 5. A sample 10A of the insulated conductor is secured on a stand 18 by clamps 20 in a horizontal manner while scraping blades 22 having a diameter of edge of 0.125 mm are mounted on the sample 10A with a weight 24 mounted on the scraping blades 22 in accordance with the size of the insulated conductor. The scraping blades 22 are moved by a stroke of about 10 mm by reciprocating means 26. In this manner, when the sample 10A is scraped by the scraping blades 22 to damage the insulation until the scraping blades 22 contact with the conductor 12, the reciprocating movement stops and the number of reciprocations (number of scraping times) is indicated on a counter, not shown.

Figure 6:
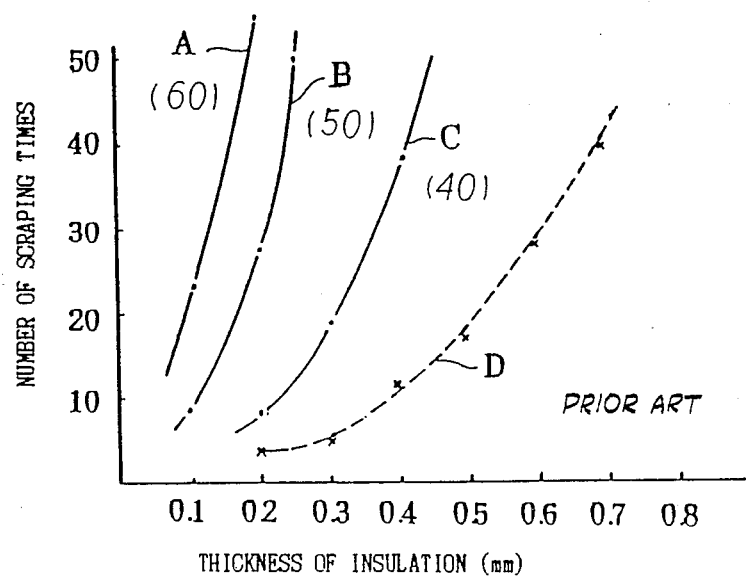
FIG. 6 illustrates curves of scraping characteristic of the insulation of the insulated conductor for wire harness.

FIG. 6 shows the number of scraping times relative to the thickness of the insulation when various insulated conductors were tested by such a tester. The load of the weight 24 used for the tests was 1.2 kg. In FIG. 6, a curve A is the number of scraping times of the insulated conductor comprising the compressed conductor covered with the insulation of thermoplastic polyurethane having shore D hardness of 60, a curve B that of the insulated conductor comprising the compressed conductor covered with the insulation of thermoplastic polyurethane having shore D hardness of 50, a curve C that of the insulated conductor comprising the compressed conductor covered with the insulation of thermoplastic polyurethane having shore D hardness of 40, and a curve D that of the prior art insulated conductor comprising the twisted conductor covered with the insulation of vinyl chloride. As noted from FIG. 6, shore D hardness of 40-60 of thermoplastic polyurethane is essentially required for providing to the insulated conductor the abrasion resistance of the insulated conductor identical or higher than to that of the prior vinyl chloride insulated conductor although the thickness of the insulation of thermoplastic polyurethane is less than 0.2 mm, which is sufficient to make the diameter of wire harness appreciably smaller.

Figure 7:
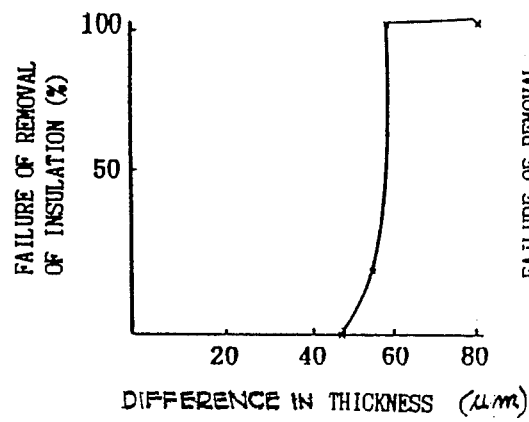
FIG. 7 illustrates a curve of failure of removal of the insulation relative to the thickness difference thereof.

It should be noted that the effectiveness of removal of the insulation 14, where needed to connect to a part 7, depends on the difference in of thickness thereof, that is the difference between the maximum thickness (t max) and the minimum thickness (t min). FIG. 7 shows the relation between the difference in thickness and a failure of removal of the insulation when there was removed the insulation of the insulated conductor which was formed by covering with the insulation of thermoplastic polyurethane of 0.15 mm thickness the conductors of concentrically twisted seven wires having a section of 0.3 mm$^2$ through 0.85 mm$^2$. As noted from FIG. 8, with the difference in thickness of the insulation of thermoplastic polyurethane being less than 40 $\mu$m, there was no failure of removal of insulation.

Figure 8:
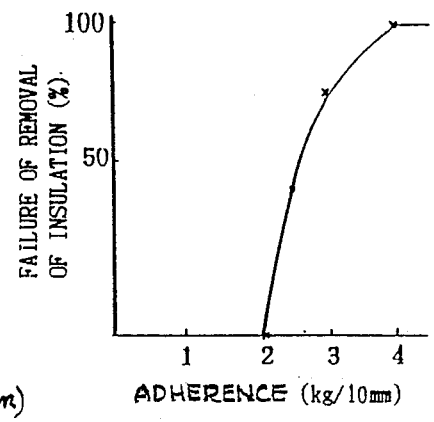
FIG. 8 illustrates a curve of failure of removal of the insulation relative to the adherence of the insulation.

It should be also noted that the effectiveness of removal of the insulation depends on the adherence of the conductor 12 to the insulation 14. The adherence of the conductor to the insulation can be expressed by a force required to put the remaining insulation of 10 mm length off the conductor after the sample of the insulated conductor of 33 mm length has the insulation of 25 mm length removed. In other words, the adherence in measured as the required pulling out force of the conductor per 10 mm length of the insulation. FIG. 8 shows a relation between the adherence of the conductor relative to the insulation and the failure of removal of the insulation from the conductor when the insulated conductor had the insulation of thermoplastic polyurethane having the differential in thickness of less than 40 μm. As noted from FIG. 8, with the adherence of the conductor to the insulation being less than 2 kg/10 mm, there was no failure of removal of the insulation. Decreasing adherence of the conductor to the insulation may be effected by omitting to preheat the conductor, passing the conductor through a pipe-type die or nipple and coating the conductor with activator.

Figure 9:
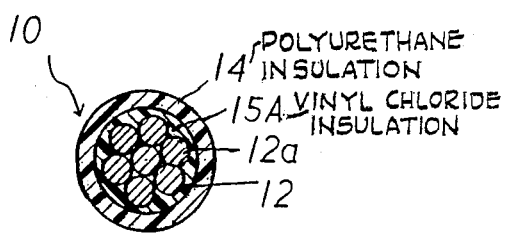
FIG. 9 is a cross sectional view of an insulated conductor constructed in accordance with another embodiment of the invention.

FIG. 9 shows another embodiment of the invention in which there is a middle layer 15A of vinyl chloride resin between the insulation 14 of thermoplastic polyurethane and the conductor 12. With this embodiment, since there is disposed the middle layer 15A of smaller pulling force between the conductor and the insulation, the adherence of the conductor 12 to the insulation 14 is lower, which causes removal of the insulation 14 to be more easily made and softness to be provided to the insulated conductor. In one example, a wire harness including the insulated conductors, which had the middle layer 15A of vinyl chloride of 0.05 mm thickness covered on the conductors having a cross section of 0.3 through 0.85 mm² and the insulation 14 of thermoplastic polyurethane of 0.15 mm thickness covered on the middle layer 15A had the diameter decreased 25 through 30% and the weight decreased about 20% in comparison with those of prior wire harness including the insulated conductors which had only the insulation of vinyl chloride.

Figure 10:
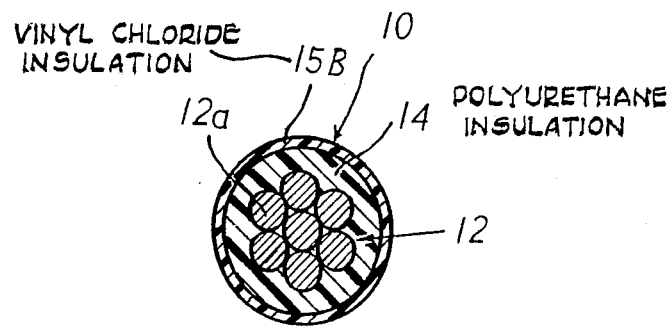
FIG. 10 is a cross sectional view of an insulated conductor constructed in accordance with a further embodiment of the invention.

FIG. 10 shows a further embodiment of the invention in which there is a layer 15B of non-combustible vinyl chloride covered on the insulation 14 of thermoplastic polyurethane. With this embodiment, combustibility of thermoplastic polyurethane is obstructed by non-combustibility of the layer 15B of vinyl chloride to provide non-combustibility to the insulated conductor. It should be noted that the total thickness of the insulation of thermoplastic polyurethane and the layer of non-combustible vinyl chloride can be less than 0.2 mm by selecting proper hardness of the insulation of thermoplastic polyurethane. In examples, the thickness of the insulation of thermoplastic polyurethane was 0.18 mm (shore D hardness of 60), 0.15 mm (shore D hardness of 60) and 0.10 mm (shore D hardness of 65) while the thickness of the layer of non-combustible vinyl chloride was 0.02 mm, 0.05 mm and 0.10 mm, respectively.

While some preferred embodiments of the invention have been described and illustrated with reference to the accompanying drawings, it will be understood by those skilled in the art that they are by way of example and that various changes and modifications may be made without departing from the spirit and scope of the invention, which is intended to be defined only by the appended claims.

What is claimed is:

1. An insulated conductor for a wire harness comprising a conductor and an insulation with which said conductor is covered, said insulation characterized by being formed of thermoplastic polyurethane having shore D hardness of more than 50 and a thickness of less than 0.2 mm, and wherein the adherence of the insulation to said conductor is less than 2 kg/10 mm, being measured as the required force to pull 10 mm of the insulation off the conductor.

2. An insulated conductor for a wire harness as set forth in claim 1, and wherein said conductor comprises twisted wires.

3. An insulated conductor for a wire harness as set forth in claim 1, and wherein said conductor comprises a compressed conductor formed by compressively deforming a twisted body of wires into a body having a substantially round cross section.

4. An insulated conductor for a wire harness as set forth in claim 1, and wherein said insulation has a difference of less than 40 μm between the maximum thickness and the minimum thickness thereof.

5. An insulated conductor for a wire harness as set forth in claim 1, and further comprising a middle layer of vinyl chloride thinner than said insulation between said conductor and said insulation.

6. An insulated conductor for a wire harness as set forth in claim 1, and further comprising a layer of non-combustible thermoplastic resin provided on said insulation.

7. An insulated conductor as set forth in claim 6, and wherein said layer of non-combustible thermoplastic resin comprises vinyl chloride.

* * * * *

UNITED STATES PATENT AND TRADEMARK OFFICE
CERTIFICATE OF CORRECTION

PATENT NO. : 4,734,545

DATED : March 29, 1988

INVENTOR(S) : Susuki et al.

It is certified that error appears in the above-identified patent and that said Letters Patent is hereby corrected as shown below:

```
Col. 2, line 39, after "that is" insert --,--

Col. 4, line 49, after "identical" insert --to--

Col. 4, line 56, delete --of--

Col. 4, line 56, after "that is" insert --,--

Col. 5, line 5, "put" should be --pull--

Col. 5, line 8, "in" (second occurrence) should be --is--

Col. 5, line 19, after "Decreasing" insert --the--.
```

Signed and Sealed this

Sixth Day of December, 1988

Attest:

DONALD J. QUIGG

*Attesting Officer*    *Commissioner of Patents and Trademarks*